United States Patent Office 2,757,169
Patented July 31, 1956

2,757,169

PROCESS OF RECOVERING ROSIN FROM RESINOUS WOOD

George H. Cook, Jr., Brunswick, Ga., assignor to Hercules Powder Company, Wilmington, Del., a corporation of Delaware No Drawing. Application July 9, 1953,
Serial No. 367,080

11 Claims. (Cl. 260—110)

This invention relates to an extraction process and more particularly to an improved method for extracting resinous material from wood.

It is known that pine wood may be extracted with a coal tar hydrocarbon such as benzene, and other types of solvents have also been used for this purpose. None of the solvents heretofore utilized, however, has been entirely satisfactory from an efficiency standpoint, and some of the prior art extraction solvents have had other disadvantages as well. For example, when pine wood is extracted with certain solvents, for example, acetone, and the "drop liquor," as the resulting extract solution is called, is evaporated there is formed an insoluble thermosetting precipitate which adheres to the walls of the distillation apparatus, thereby reducing efficiencies and finally necessitating work stoppage. Because the precipitate cannot be removed with solvents, the apparatus must be dismantled for cleaning. There has been a need for an extraction process which would permit greater efficiency in removal of resin from wood and which would not have the unfavorable characteristics of the prior art processes.

In accordance with this invention it has been found that resin may be extracted from pine wood by treating the resinous wood with a mixture of a ketone such as acetone or methyl ethyl ketone and an aromatic hydrocarbon solvent such as benzene. The proportion of ketone in the ketone-aromatic hydrocarbon solvent mixture may range from about 10–40% by weight and a ketone concentration of from about 20–30%, based on the weight of solvent mixture, is particularly preferred as producing the most outstanding advantages over prior art processes. The extraction process of this invention produces an increased yield of resin from pine wood ranging up to 60 lbs. per ton of wood depending upon the particular extraction conditions employed, the concentration of resin in the original wood, the percentage composition of the extracting mixture, and the nature of the aromatic hydrocarbon.

In carrying out the process of this invention, pine wood chips, preferably from the Southern long leaf pine, in the form of stump wood, root or "top" wood is extracted with a mixture of a ketone, such as acetone, and an aromatic hydrocarbon, for example, benzene, until extraction is substantially completed. The pine wood may be steamed before extraction with the ketone-aromatic hydrocarbon mixture or the extraction may be carried out without previous steaming of the wood. The solvent mixture removes from the pine wood, rosin and other resinous material, and, where the pine wood has not been previously steamed, turpentine and pine oil will also be extracted. The extract solution is then distilled to remove the solvents, and then turpentine and pine oil, if present, are also distilled off leaving a residue of pine wood resin. The desirable constituents of pine wood resin may be isolated by well known means.

The mixed solvents of this invention represent a substantial improvement over the solvents when used alone in extracting resinous wood. For example, when substantially pure acetone or methyl ethyl ketone is used to extract resin, and the extract evaporated to remove ketone, extracting and distilling apparatus constructed of ordinary materials are excessively corroded rendering the process commercially unfeasible. Also, evaporation of the ketone extract of pine wood resin results in fouling the distillation apparatus, an insoluble thermosetting precipitate forming on the walls of the apparatus with consequent reduction in distillation efficiency rendering dismantling and cleaning mandatory. Another disadvantage of these ketones as a sole extracting solvent arises from the fact that these ketones, in addition to removing desirable resins from the resinous wood, also removes many undesirable materials such as wood sugars, wood acids, and aldehydes thereby rendering very difficult the production of products with desirable properties. In contrast, the mixed solvents of this invention do not corrode equipment, do not foul the distillation apparatus by precipitation and produce typical naval store products.

The extracting power of the mixed solvents of this invention substantially exceeds that of aromatic hydrocarbon solvents. For example, "unground" pine wood chips containing 23.5% water by weight extracted with benzene at atmospheric pressure and 70° C. produced a yield of 476 lbs. resin per ton of wood on a dry wood basis, whereas under the same conditions comparable chips extracted with an acetone-benzene mixture containing 30% acetone by weight produced 531 lbs. of resin per ton of dry wood. Using the same conditions of temperature and pressure with "ground" pine wood chips containing 21% water by weight, benzene produced a yield of 580 lbs. per ton, whereas an acetone-benzene mixture containing 30% acetone produced a yield of 610 lbs. per ton. Comparable improvements over benzene and toluene may be obtained using benzene-acetone and toluene-acetone mixtures, and benzene-methyl ethyl ketone and toluene-methyl ethyl ketone mixtures having ketone concentrations ranging from 10–40% by weight, and in no instance is the distilling apparatus fouled when the extraction solution was evaporated following removal of any water layer present.

The table shows results of extracting pine wood with ketone-aromatic hydrocarbon mixtures compared with results obtained with benzene and toluene as sole extractants.

*Table*

| Wood Batch | Particle Size | Percent $H_2O$ | Temperature, °C. | Pressure, p. s. i. g. | Solvent Mixture [1] | Yield, lbs. per ton wood | Extraction Efficiency | Analysis of Extract | | |
|---|---|---|---|---|---|---|---|---|---|---|
| | | | | | | | | Acid No. | Melting Point, °C. | Percent Gasoline Insoluble |
| 2 | Unground | 22.0 | 129 | 95 | Benzene | 436 | 93.2 | 151 | 82 | 12.3 |
| 2 | do | 26.0 | 143 | 95 | Toluene | 403 | 87.1 | 151 | 82 | 10.0 |
| 2 | do | 22.0 | 120 | 95 | 10% Acetone-Benzene | 442 | 96.0 | 149 | 82 | 15.3 |
| 2 | do | 22.0 | 120 | 95 | 20% Acetone-Benzene | 463 | 96.5 | 148 | 82 | 15.7 |
| 2 | do | 24.0 | 130 | 95 | 20% Acetone-Toluene | 456 | 94.9 | 151 | 83 | 13.7 |
| 1 | do | 25.5 | 129 | 95 | 20% Methyl Ethyl Ketone + Benzene | 436 | 91.6 | 148 | 81 | 15.2 |
| 1 | do | 25.5 | 129 | 95 | Benzene | 420 | 88.2 | 152 | 79 | 12.2 |

[1] Percentages refer to percent ketone in mixture based on mixture.

In carrying out the process of this invention any convenient conditions of temperature and pressure may be utilized. It is desirable, however, to use temperatures ranging from 100–175° C. using pressures of 50–200 p. s. i. g. For commercial practice it is preferred to use temperatures of 125–150° C. and pressures of 90–170 p. s. i. g. In general, the smaller the chip size of the resinous wood, the more moderate may be the extraction conditions without seriously reducing efficiencies.

Unlike some of the prior art processes, the practice of this invention does not require that the resinous wood have any particular moisture content or be milled to any impractically small size. The advantages of this invention may be obtained using wood containing from about 5% moisture to upwards of 30% moisture and is particularly useful with wood containing from 15–25% moisture by weight. Notwithstanding this fact, however, it has been found that the spent wood produced as a by-product in the process of this invention has a lower moisture content than spent wood obtained by prior art processes and is more useful as fuel.

The mixed solvents of this invention may comprise a mixture of either acetone or methyl ethyl ketone or both with one or more aromatic hydrocarbon solvents having high solvency power for resinous material. Benzene, toluene, xylene and similar aromatic hydrocarbons or mixtures thereof with acetone or methyl ethyl ketone may be utilized, but benzene is particularly preferred, having been found to posses higher solvency power than related aromatic hydrocarbons.

The process of the invention can be utilized in either a batch or continuous operation and is suitable for countercurrent extraction techniques. In the latter type of operation, a quantity of wood is passed through a number of extraction stages and treated in each stage with, for example, an acetone-benzene portion. The extract solutions are maintained separate from one another. The extract solution from stage 1 is directly distilled, following removal of any water layer present, to recover solvents and resin. The extract solution from stage 2 is used to extract resins from the fresh batch of wood chips entering stage 1 and the extract solution from each of the remaining stages is used as extractant in each of the preceding stages (based on the flow of wood chips through the operation). In the last stage of wood chip treatment, fresh mixed solvent is used as extractant. In this manner, maximum utilization of the extracting power of the solvent mixture is obtained in that the solvent mixture having the greatest extracting power contacts wood least rich in resin, and solvent mixture having the least extracting power (i. e., being richest in resin) contacts wood richest in resin. By operating in this manner equilibrium conditions may be maintained and the most efficient use of solvent achieved.

What I claim and desire to protect by Letters Patent is:

1. In the process of recovering rosin from resinous wood, the step comprising extracting the wood with a ketone-aromatic hydrocarbon solvent mixture containing from about 10% to about 40% ketone by weight, said ketone being selected from the group consisting of acetone, methyl ethyl ketone and mixtures thereof.

2. The process of claim 1 in which the ketone is acetone and the aromatic hydrocarbon is benzene.

3. The process of claim 1 in which the ketone-aromatic hydrocarbon solvent mixture contains from about 20–30% ketone by weight.

4. The process of claim 3 wherein the aromatic hydrocarbon is benzene.

5. The process of claim 3 wherein the aromatic hydrocarbon is toluene.

6. The process of claim 3 wherein the ketone is acetone.

7. The process of claim 6 wherein the aromatic hydrocarbon is benzene.

8. The process of claim 6 wherein the aromatic hydrocarbon is toluene.

9. The process of claim 3 wherein the ketone is methyl ethyl ketone.

10. The process of claim 9 wherein the aromatic hydrocarbon is toluene.

11. The process of claim 9 wherein the aromatic hydrocarbon is benzene.

References Cited in the file of this patent

UNITED STATES PATENTS

| | | |
|---|---|---|
| Re. 19,749 | Bent | Nov. 12, 1935 |
| 1,059,261 | Bashlin | Apr. 15, 1913 |
| 1,805,883 | Nordenswan | May 19, 1931 |
| 2,423,020 | Haun | June 24, 1947 |
| 2,424,628 | Palmer | July 29, 1947 |

OTHER REFERENCES

Chastaignet: Chem. Abst., vol. 44, pp. 7528–29 (1950).